Patented Aug. 9, 1932

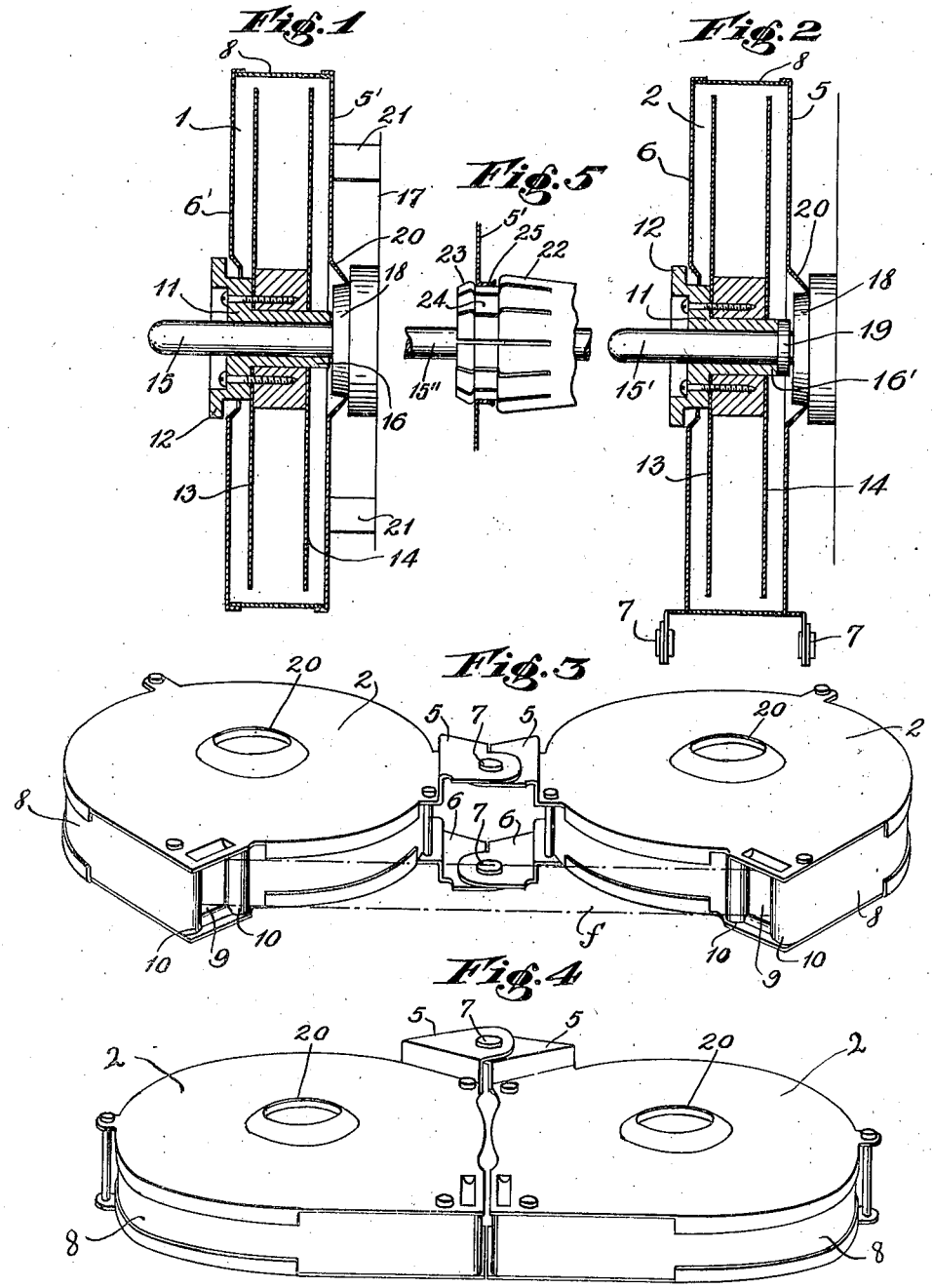

1,871,236

UNITED STATES PATENT OFFICE

BARTON ALLEN PROCTOR, OF PELHAM MANOR, NEW YORK, ASSIGNOR, BY MESNE ASSIGNMENTS, TO KINATOME PATENTS CORPORATION, OF NEW YORK, N. Y., A CORPORATION OF NEW YORK

CONTAINER FOR FILMS AND MEANS FOR HANDLING THE SAME

Application filed January 16, 1929. Serial No. 332,883.

My invention can be applied to any art in which material is fed from or to a carrier, and is particularly useful in connection with carriers for films, whether for light sensitive material adapted for use with a camera or sound recording apparatus or for image bearing material adapted for use with a motion picture or stereoptican projector or with a sound reproducing instrument or with an apparatus adapted for the simultaneous reproduction of visual images and sound.

The present invention, in some of it aspects, is an improvement upon the structure disclosed and claimed in the co-pending application of Warren Dunham Foster, Serial Number 332,840, filed January 16, 1929.

My invention includes means whereby both the outer protective casing and the inner spool of a film holder may be supported upon the film handling mechanism with which the film holder is used, each independently of the other. Such a provision of independent supports for the inner film receiving member and the outer protective casing makes it possible for a relatively cheap structure to be employed, without the disadvantages which inevitably arise in case there is friction between the film spool and the outer casing. If the film holder is placed upon the spindle of the film handling mechanism as has been common in the past and no special provision is made for avoiding the friction which results from the carrying of the weight of the holder upon the inner spool or upon the spindle, improper conditions of feeding quickly result since under such conditions the fragile film is subjected to increased tension due to this friction.

According to a preferred way of practicing my invention, as is clearly shown in Figure 5 of the drawing, a sheet metal wall portion of the apparatus is formed as a bead or knob which is so constructed as to provide a plurality of resilient members circumferentially disposed around an axial opening in the outer end of this knob, which thereby functions for fastening the film holder on the apparatus as does a snap fastener part widely used on articles of clothing. To cooperate with the snap fastener knob, a flanged opening is provided in a wall of the film holder. It is a feature of my invention to mount this snap fastened knob in coaxial relation to the spindle which extends through the opening in the knob and is considerably smaller in diameter than the opening so as to be spaced well away from the periphery of the same.

I am aware that means for locating or positioning the outer protective casing and the inner film spool independently of each other are known. My present invention has for one of its objects the provision of means whereby such outer protective casing and inner film spool may be supported independently of each other, the means for accomplishing the independent supporting of the protective casing and spool becoming automatically effective upon the placing of the film holder in assembled relation with film handling mechanism. My invention eliminates the necessity for the provision of a separate mechanism which must be operated by a distinct hand operation to hold and support the outer casing independently of the inner spool after such casing and spool have been located independently of each other.

I may choose to apply my invention to a double magazine or to a single magazine of the type described in my co-pending application Serial Number 54,910, filed September 8, 1925 from which a divisional application Serial Number 332,881 has been filed January 16, 1929 or to a film holder of the type described in the application of Edith Dunham Foster and Clarkson Ulysses Bundick and myself, Serial Number 332,882 filed January 16, 1929 or to any other desired type of film holder.

Other objects, advantages and characteristics are apparent in the following description, the attached drawing, and the subjoined claims. Although I am showing one preferred embodiment of my invention, it will be readily understood that I am not limited to this particular construction as changes can readily be made without departing from the spirit of my invention or the scope of my broader claims.

In the drawing:

Figure 1 is a view of a film holder supported in a film handling mechanism in accordance with my invention.

Figure 2 is a view of a preferred modification of a film holder, in which the element limiting the lateral movement of the inner spool is carried upon the spindle.

Figure 3 is a perspective view of a double film holder, in open position, embodying supporting means in accordance with my invention.

Figure 4 is a similar view, showing such film holder in closed position.

Figure 5 is a view of a preferred modification, showing supporting mechanism carried by the apparatus.

A film holder for use with the present invention may be of a double or single type.

Such a double film holder may comprise a plurality of containers 2, in each of which there may be mounted a film spool. Each of the containers may be provided with plates 5 and 6 projecting therefrom and hingedly connected in any desired manner as by hinges 7, permitting the containers 2 to be swung from and toward each other about the axis of the hinges. The positioning of the plates 5 and 6 and the hinges may be such that when the containers are moved away from each other as shown in Figure 3 they will be in the correct relative positions required by the particular film handling apparatus with which the holder is to be used. To prevent interference with the path of light of the apparatus with which the holder is used, the hinges may be offset, the distance therebetween being greater than the width of the containers. The casings 8 enclosing the ends of the containers may be suitably attached to the plates 5 and 6.

Each of the containers 2 may be closed on its periphery except for a small opening 9 through which the film f passes. These openings may be so positioned relative to the pivotal axis 7 that when the containers are moved toward each other to the closed position shown in Figure 4 the length of film exposed between them is reduced. Each of the openings may be provided with surfaces 10 of suitable construction adapted when swung together to provide a complete inclosure for the film. A light trap may be provided.

A single film holder 1 for use with the present invention may be of construction similar to that of the container 2, as clearly shown in Figure 1. In such a single container, the plates 5' and 6' will not be extended beyond the casing.

Within such container 1 or 2, I may place a film supporting spool, reel or other element of any desired construction. I may prefer to use a film supporting structure and mechanism cooperating therewith such as that clearly shown in Figures 1 and 2 and disclosed and claimed in my co-pending application, Serial Number 332,879, filed concurrently herewith, which is a divisional application from my co-pending application Serial Number 54,910, filed September 8, 1925.

I may construct this spool or reel with a central hub 11 which extends outwardly and beyond the side 6 of the casing. Such hub and the container with which it is used may have coaxial openings. The left portion of this extension as viewed in Figures 1 or 2 of the drawing, I may provide with an enlargement 12 which forms a convenient handle or knob whereby the user may move the inner reel relatively to the outer container. Supported by the hub substantially at right angles thereto and in spaced parallelism to each other there may be provided the flat reel sides 13 and 14. I may construct the hub 11 and the handle 12 of one piece of metal, which may be formed on a lathe or a screw machine or otherwise. I may form a handle and the central core in such manner and force it within a wooden disc with an axial opening therein and attach it thereto as by screws, or by other means. Under some conditions it is desirable to form this element of brass, which is well suited for cooperation with the steel spindle 15 of the apparatus.

I may form the hub with an extension 16, upon the side other than that provided with the knob 12, which projects to the right as viewed in Figure 1 beyond the side 14 of the reel, or with an extension 16' of the character shown in Figure 2.

As is clearly shown in Figure 1, the spindle 15, journalled for rotation in the wall 17 of the film handling apparatus, may extend through a forwardly facing boss 18 against which the surface of the extension 16 on the hub 11 abuts when the hub is moved to the right as viewed in Figure 1 into assembled relation with the spindle. It will readily be seen that this boss 18 will co-act with such surface of the extension 16 to limit the lateral movement of the film spool and to hold the side plate 14 well separated from the casing side 5 and hence position the film in proper lateral relation with the opening 9 of the container.

In a preferred modification shown in Figure 2, I may construct the spindle 15' with an enlargement or stop 19 which co-acts with the extension 16' of the hub to prevent undue lateral movement of the inner reel relative to the outer container. According to such construction since the stop 19 revolves with the abutting surface of the extension 16', all rotational friction between the reel and the apparatus is obviated.

To support the film holder upon the apparatus, independently of the means employed to support the inner film reel, I may construct the inner plate 5 of the outer casing of the film holder with an outwardly extending protuberance 20 surrounding the opening therein. Since I prefer to stamp the outer casing from sheet steel of relatively light gauge it will be readily understood that this extension 20 will possess a large degree of resiliency. I have found moreover that when I stamp the outer protective casing from aluminum of a suitable alloy to give it sufficient hardness, such a protuberance 20 possesses resiliency. In some cases, I have found it desirable slightly to dress down the outer edge of such projection to increase its resiliency.

It will be readily understood that when such a container is assembled upon the spindle 15 or 15', the spring like extension 20 of the inner wall 5 of the outer protective casing of the film holder slips over the boss 18 and establishes firm contact therewith. The forward surface of such boss may be slightly tapered to facilitate the positioning of such protuberance thereupon. As a result, the outer protective casing is not only positioned by the co-action of the projection 20 of the film holder and the projection 18 of the film handling mechanism, but also the entire weight thereof is supported thereby. The spindle 15 or 15' having entered the axial opening in the film spool, the film spool is positioned upon and completely supported by the spindle. As the operator pushes the container inwardly, he may apply pressure to the extending knob 12 and thus push the inner spool inwardly, which will abut the inner edge of the knob 12 against the forward plate 6 of the container and bring into approximate co-axial alignment the spindle receiving openings in the spool core 16 and the container 1, preparatory to the insertion of the spindle through the openings. This inward movement of the spool is mounted as above described when the spool and the container are operatively mounted on the spindle, and the spool and the container are so positioned as to prevent frictional engagement therebetween.

It will be readily understood that as the user pushes the container toward the apparatus, the rounded head of the spindle finds its way at once through the opening in the outer contaner and into the opening in the hub without any especial attention on the part of the user. If desired, the inner end of the hub opening may be slightly relieved to facilitate this operation, but such relief is not necessary.

If desired the blocks 21 may be attached to the film handling instrument further to limit the possibility of relative movement between the container and instrument during the operation thereof.

In a preferred modification of my invention, as is clearly shown in Figure 5, the element which supports the container may be positioned upon the apparatus. Such modification may be employed with the form of my invention shown in Figure 1 or that shown in Figure 2. Circumferentially arranged about the spindle 15", I may place a series of springs 22. The left hand or outer portion 23 of such springs as viewed in Figure 5 may be bent inwardly relatively to the spindle, with an offset portion 24 to the right thereof as viewed in Figure 5. To coact with such springs, the inner wall 5' of the container may be bent outwardly substantially at right angles, and when at the extreme edge slightly bent away from the spindle, forming a supporting shoulder 25.

If desired, such a supporting element may be formed of one piece of spring steel, or separate pieces of non-resilient metal may be arranged circumferentially about the spindle suitably attached to the apparatus and urged outwardly as by suitable spring means.

As will be readily understood by those skilled in the art, the above described construction makes possible the correct axial positioning and supporting of the inner film spool relative to the outer container and of the container relative to the film handling apparatus by one movement of the hands of the operator as he places the holder into operative position upon the apparatus, the container being supported independently of the reel. If the holder is of the type consisting of two hinged containers, the user swings such containers apart on their hinges, grasping each of the containers with the fingers of one hand. He then moves the containers toward the apparatus, the spindles 15" finding their places within the co-axial openings of the outer casing and the inner spool. As he pushes the containers onto the apparatus, the supporting shoulders 25 of the containers engage the forwardly facing inclined portion 23 of the circumferential springs, urge such springs toward each other, and slip into the offset portion 24, the springs firmly supporting the containers and preventing accidental movement in a direction away from the apparatus. The inward surface of the projection 16 of the hub 11 engages with the boss 18, or in the modification shown in Figure 2, the projection 16' engages with the collar 19, thus axially positioning the inner spool.

If the holder is of the type consisting of a single container, the user merely introduces the spindle 15" into the coaxial openings of the outer casing and inner reel, and proceeds as above.

Certain advantages of my invention have been stated in the above portion of this specification. Other advantages include improved means for the positioning and supporting of the outer protective casing and the inner film spool of a film holder independently of each other, both axially and radially or circumferentially, in reference to each other and to the film handling apparatus. Still further advantages include the maintenance of the opening of the container in correct operative position relative to the apparatus and to the film spool.

I claim:

1. Film handling apparatus, including a spindle, a container having a spindle receiving opening in a face thereof, and snap fastener and mechanism supported by said apparatus adapted to engage said opening whereby the periphery of said opening is maintained in spaced relation to said spindle, said mechanism being immediately effective upon the placing of said container in assembled relation with said apparatus.

2. Film handling apparatus, including a container having a spindle receiving opening therein, and resilient members supported upon said apparatus constructed to engage the periphery of said opening and to maintain said opening in the desired operative position relative to said apparatus.

3. Film handling apparatus, including a container having a spindle receiving opening therein, and mechanism adapted to engage the periphery of said opening in said container and to maintain said opening in the desired operative position, said mechanism including a resilient member comprising an outer portion inclined toward the axis of said opening and an inner portion first offset from said first mentioned portion and then bent away from said axis.

4. Film handling apparatus, including a spindle adapted to support a film spool, a container, a film spool movable therewithin and relatively thereto, said container and said spool having aligning openings for the reception of said spindle, the spindle receiving opening in said container being larger than said spindle, and resilient members carried by said apparatus and constructed for engagement with said container at points on the periphery of said opening therein and for maintaining said periphery in spaced relation to said spindle.

5. Film handling apparatus, including a spindle adapted to support a film spool, a container, a film spool movable therewithin and relatively thereto, said container and said spool having aligning openings for the reception of said spindle, and a spring member projecting from said apparatus and fixed thereto against rotative movement relative thereto and adapted directly to engage said opening in said container and to maintain said opening in the desired operative position.

6. Film handling apparatus, including a spindle adapted to support a film spool, a container, a film spool movable within said container and relatively thereto, said container and said spool having aligning openings for the reception of said spindle, and spring means supported by said apparatus and adapted directly to engage said opening in said container whereby said container is supported independently of said spool.

7. Film handling apparatus, including a spindle adapted to support a film spool, a container, a film spool movable within said container and relatively thereto, said container and said spool having aligning openings for the reception of said spindle, the spindle receiving opening in said container being larger than said spindle, and spring means supported by said apparatus and adapted directly to engage said opening in said container whereby said container is maintained in spaced relation to said spindle.

8. Film handling apparatus including a spindle, a container having a spindle receiving opening therein, and snap fastener means for maintaining the periphery of said opening in spaced relation to said spindle, said means including a member projecting from said apparatus for engaging the periphery of said openings.

9. Film handling apparatus, including a spindle adapted to support a film spool, a container, a film spool movable therewithin and relatively thereto, said container and said spool having aligning openings for the reception of said spindle, and a member extending from said apparatus and constructed for engagement with said container at points on the periphery of said opening therein and for supporting said container in the desired operative relation to said apparatus, said member and said periphery being characterized by mutually engaging surfaces at least one of which is resilient.

10. Film handling apparatus, including a spindle adapted to support a film spool, a container, a film spool movable therewithin and relatively thereto, said container and said spool having aligning openings for the reception of said spindle, the surface of said container adjacent said opening being constructed of resilient material, and a boss extending from said apparatus and constructed for engagement with said resilient material whereby said container is supported upon said apparatus independently of said spool.

11. Film handling apparatus and a container for use therewith, said container being formed with an opening which is formed by a surface which is constructed of resilient material, and a boss extending from said apparatus and adapted to engage said resilient surface whereby said container is supported in the desired operative relation to said apparatus.

12. Film handling apparatus, including a frame and a spindle adapted to support a film spool, said spindle projecting from said frame in a direction normal thereto, a container, a film spool movable therewithin and relatively thereto, said container and spool having aligning openings for the reception of said spindle, and means for supporting said container in the desired operative relation to said apparatus, said means including a conical boss projecting from said frame and adapted to engage the periphery of said opening in said container, said boss being formed with an opening through which said spindle projects, and a plurality of members extending from said frame in spaced relation to said boss and adapted to engage said container for maintaining it in spaced and parallel relation with said apparatus.

13. In a film handling apparatus, a spindle adapted to support a film spool, a film holder comprising a normally closed container, an unmounted film spool bodily movable therewithin and designed to be positioned therewithin during the storage, shipment and use of the film supported thereby, said container and spool being mountable upon said apparatus as a unit and so demountable therefrom, said container and said spool having openings for the reception of said spindle, and latch mechanism supported by the apparatus and constructed for direct engagement with the surface forming said opening in said container and necessarily effective upon the placing of said film holder in assembled relation with said apparatus for bringing said spindle receiving openings into axial alignment and supporting said container independently of said spool and latching said container in place and for holding said container in operative relation with said apparatus.

14. In a film handling apparatus, a spindle adapted to support a film spool, a film holder comprising a container, a film spool movable therewithin and relatively thereto, said container and said spool having aligning openings for the reception of said spindle, and resilient means on said apparatus constructed for direct engagement with the rim of said opening in said container for supporting said container independently of said spool.

15. Film handling apparatus, including a spindle, a container having a spindle receiving opening therein, said spindle receiving opening being larger than said spindle, mechanism carried by the apparatus and constructed for direct engagement with the periphery of said opening and necessarily rendered effective by the movement of said container into engagement with said mechanism for supporting said container in spaced relation to said spindle, and fastening means formed on said mechanism for detachably fastening said container on said apparatus.

16. In a film handling apparatus, a revoluble spindle adapted to support a film spool, a film holder comprising a container, an unmounted film spool bodily movable within said container and relatively thereto, said container and said spool each having an opening for the reception of said spindle, said opening in said container being larger than said spindle and said opening in said spool being of substantially the same size of said spindle whereby said spool may be mounted thereupon and revolved thereby, and mechanism carried by said apparatus and engaging the periphery of said opening in said container and necessarily effective concomitantly with the introduction of said supporting spindle through said opening of said spool for supporting said container in spaced relation to said spool with the spindle receiving openings in said container and in said spool in axial alignment, and means adjacent said mechanism for necessarily latching said container on said apparatus upon assembly therewith.

17. Film handling apparatus, including a spindle adapted to support a film spool, a container, an uncounted film spool bodily movable therewithin and relatively thereto, said container and said spool having openings for the reception of said spindle, mechanism carried by said apparatus engaging the periphery of said opening in said container for supporting said container independently of said spindle and latching said container on said apparatus so as to be completely releasable therefrom by a single bodily movement of said container away from said apparatus in a direction parallel to the axis of said spindle, and means for positioning said spindle receiving openings in said spool and in said container into approximate axial alignment preparatory to mounting said container on said apparatus.

18. A film holder for use with a film handling apparatus having a spindle, said film holder including, in combination, a flat container having aligning openings in both of its two sides, said sides being disposed in spaced parallelism to each other, a film reel disposed within said container and bodily movable relatively thereto and having an axial spindle receiving opening therein, one of said openings in said container being so positioned in the first of said two sides as to cooperate with said film-receiving opening of said reel and to receive said spindle preparatory to its introduction into said spindle-receiving opening of said reel, means coacting between said apparatus and said container for mounting said container upon said apparatus independently of said reel when said reel is mounted upon said spindle, said first side of said container being positioned relatively adjacent said apparatus when said film holder is mounted thereupon, and means for moving said reel within said container into a position wherein the opening therein is disposed in approximate alignment with the spindle-receiving opening in said container preparatory to the mounting of said holder on said apparatus, said moving means including a member connected with said reel and extending therefrom outwardly from the second of the two flat sides of said container through said opening therein and in a direction away from said apparatus, said opening through which said member extends being substantially larger than the portion of said member which is disposed relatively adjacent thereto, whereby said reel is bodily movable within said container and tends to tilt therewithin when it is not mounted upon said spindle thus destroying the alignment between the opening therein and said spindle, said member having an enlarged outer portion disposed in a plane substantially normal to the axis of said reel and arranged to be moved into engagement with said second side of said container for moving said film reel within said container and bringing said spindle-receiving opening in said reel into parallelism to the spindle-receiving opening of said container and into approximate alignment therewith preparatory to the mounting of said holder on said apparatus.

Signed at New York city, in the county of New York, and State of New York, this 28th day of December, A. D. 1928.

BARTON ALLEN PROCTOR.